United States Patent [19]

Dorschner et al.

[11] Patent Number: 5,084,898

[45] Date of Patent: Jan. 28, 1992

[54] PASSIVE PATHLENGTH CONTROL MIRROR FOR LASER

[75] Inventors: Terry A. Dorschner, Newton Centre; Irl W. Smith, Jr., Concord; Michael K. O. Holz, Newton Centre, all of Mass.

[73] Assignee: Raytheon Company, Lexington, Mass.

[21] Appl. No.: 630,213

[22] Filed: Dec. 18, 1990

[51] Int. Cl.$^5$ ............................................. H01S 3/08
[52] U.S. Cl. ..................................... 372/107; 372/94; 372/34; 356/350
[58] Field of Search ...................... 372/107, 99, 36, 34, 372/94; 356/350

[56] References Cited

U.S. PATENT DOCUMENTS

| | | | |
|---|---|---|---|
| 4,317,089 | 2/1982 | Grant, Jr. et al. | 372/94 |
| 4,581,629 | 4/1986 | Harvey et al. | 372/36 |
| 4,628,515 | 12/1986 | Rodloff et al. | 372/94 |
| 4,748,482 | 5/1988 | Collins | 372/36 |

Primary Examiner—Léon Scott, Jr.
Attorney, Agent, or Firm—Poms, Smith, Lande & Rose

[57] ABSTRACT

A laser mirror mounting arrangement for a laser formed within a laser body is shown. The mounting arrangement includes a mounting base mounted upon the laser body. A stem is attached to the mounting base to which, in turn, the laser mirror is mounted. The stem has a coefficient of thermal expansion selected to maintain the mirror in a fixed position. This is accomplished by permitting the stem to expand due to thermal expansion in one direction, while the laser body expands due to thermal expansion in the opposite direction.

21 Claims, 1 Drawing Sheet

PASSIVE PATHLENGTH CONTROL MIRROR FOR LASER

BACKGROUND OF THE INVENTION

1. Field of the Invention

The present invention relates to a laser mirror mount and, more particularly, to a mirror mount that provides passive pathlength control (PPLC) which compensates for the thermal expansion of the laser body.

2. Description of Related Art

Lasers have been known and used since the early 1960s. One class of laser utilizes two mirrors and a single linear path for generating a beam that may be used for various purposes. In another class of lasers, the laser path is established by three, four or more mirrors in a ring. Two or more laser beams are then propagated in opposite directions within the ring to establish a beat frequency. As the laser ring is moved, the beat frequency will change since the light beam traveling in the direction of movement will take slightly longer to traverse the ring, while the light traveling in the opposite direction of the movement will take slightly less time to traverse the ring. This forms the basis for a ring laser gyro which is used as a navigational device.

Typical ring laser gyros may utilize two, four, six or more frequencies. As stated, they may also utilize three, four or more mirrors to form the desired ring.

Ring laser gyros may be formed as a flat laser ring or a folded laser ring. A typical flat laser ring utilizing four mirrors is shown in U.S. Pat. No. 4,317,089, patented Feb. 23, 1982 by D. C. Grant, et al. A ring laser gyro formed by four mirrors arranged on the corners of a block that defines the vertices of a tetrahedron is shown in U.S. Pat. No. 4,813,774, patented Mar. 21, 1989, by T. A. Dorschner, et al., which is assigned to the same assignee as the present invention. A similar laser formed on a block with four mirrors forming a ring on two orthogonal planes and only two of the four mirrors on the vertices of the block is shown in U.S. Pat. No. 4,818,087, issued Apr. 4, 1989, to T. A. Dorschner, also assigned to the assignee of the present invention. A low-cost, six-frequency ring laser gyro with a non-planar, irregular closed path between mirrors is shown in U.S. Pat. No. 4,687,331, patented Aug. 18, 1987, to M. Holz, et al., assigned to the same assignee at this invention.

Almost all present day ring laser gyros use one or more actively controlled, deformable mirrors to maintain a constant pathlength therein. Control of the deformable mirrors is generally accomplished by use of a thin diaphragm which is flexed by a piezoelectric crystal. It has been found that this flexure of ring laser gyro mirrors using piezoelectric crystals causes the diaphragmed mirrors to tilt as flexed. The flexure can also occur with temperature changes of the pathlength control mirror. The mirror tilt due to flexure or temperature change causes the reflection point upon the mirror that establishes the laser pathlength to walk across the mirror. Such beam walk causes significant changes within the pathlength of the laser which can cause the output of the gyro to vary several degrees per hour. The laser bias caused by those variations is an error all manufacturers strive to reduce.

SUMMARY OF THE INVENTION

Accordingly, it is an object of the present invention to provide an improved laser mirror mount for a ring laser gyro.

It is another object of the present invention to provide a laser mirror mount that will eliminate the tilt and hysteresis normally found within previous piezoelectric mirrors for establishing improved pathlength control.

It is yet another object to reduce costs, improve the ruggedness of the laser, both from the high-g or radiation hardening viewpoint, and to reduce sensitivity to vibration.

In accomplishing these and other objects there is provided a laser mirror mount with a mounting base that mounts upon the body of a laser. A stem is attached to the mounting base that extends therefrom toward the laser. A laser mirror is then mounted upon the stem. The stem is selected from a material having a coefficient of thermal expansion that will retain the mirror mounted thereon at the same fixed point in the laser path, while the laser body and the mounting base of the laser mirror mount and its stem undergo thermal expansion due to thermal heating. This is accomplished by designing the stem to expand in one direction due to thermal heating, while the laser body expands in the other direction. Such an arrangement is referred to as passive pathlength control (PPLC).

BRIEF DESCRIPTION OF THE DRAWINGS

The reader will have a better understanding of the objects and attendant advantages of the present invention after reference to the following drawings and specifications, wherein.

DESCRIPTION OF THE PREFERRED EMBODIMENTS

Figure 1:
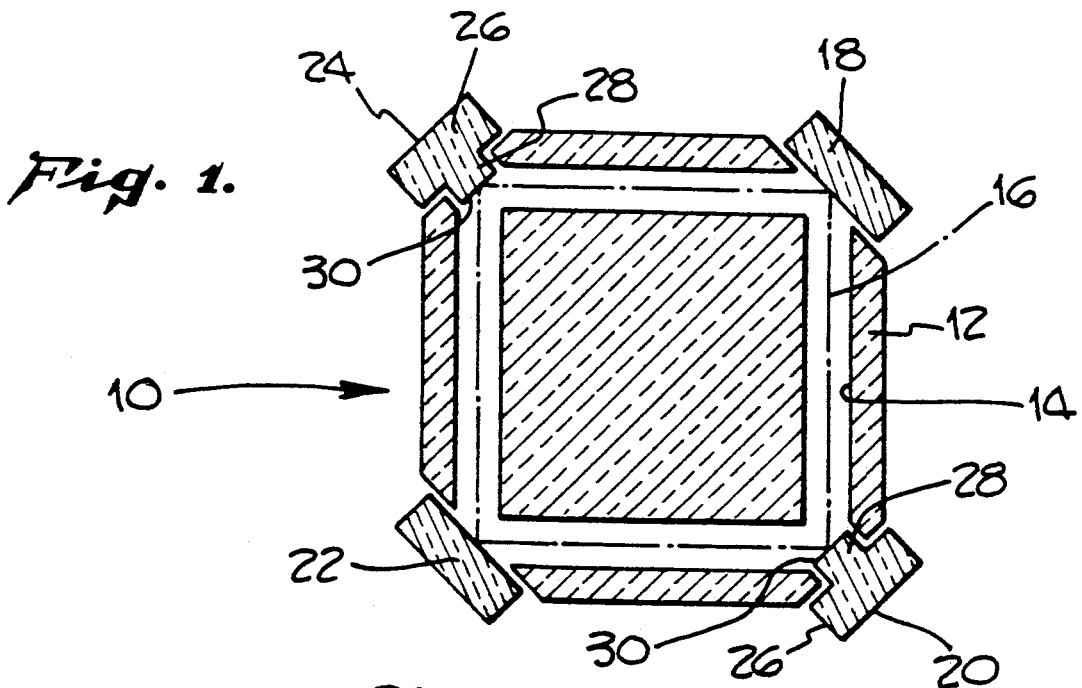
FIG. 1 is a top view schematically showing a ring laser gyro with improved laser mirror mounts of the present invention.

Referring now to the drawings, FIG. 1 shows a typical ring laser gyro 10 constructed within a laser body 12 which may take the form of a block of low expansion material such as a machinable glass-ceramic material commercially available as Zerodur manufactured by Shott Optical Company, quartz, fused silica, pyrex, or Rayceram, a pressed ceramic material manufactured by the assignee of the present invention. A passage 14 may be formed within the laser body 12 by boring apertures from opposite corners of the body 12. The passage 14 forms a ring about which a laser beam or beams having a pathlength shown schematically at 16 may be propagated with the aid of reflective laser mirrors 18, 20, 22 and 24. In the embodiment shown, the ring laser gyro created within the laser body 12 is established within a single plane with mirrors 20, 22 and 24 being fully reflective, while mirror 18 is partially reflective. While the laser body shown in FIG. 1 is shown as a flat square, other shapes are also possible within the teachings of this invention. Further, it will be understood that the pathlength established by beam 16 may be folded as either a folded rhombus or a folded tetrahedron. Similarly, the laser path 16 may be a single linear path between two mirrors or a triangular path between three mirrors or a tetrahedral path between four mirrors.

Mirrors 20 and 24 include a mirror mounting base 26 having an inner surface that mounts against the laser body 12. Extending from this inner surface of the mounting base 26 and toward the laser body 12 is a mirror stem 28 upon which is mounted a laser mirror 30, best seen in FIG. 2.

Figure 2:
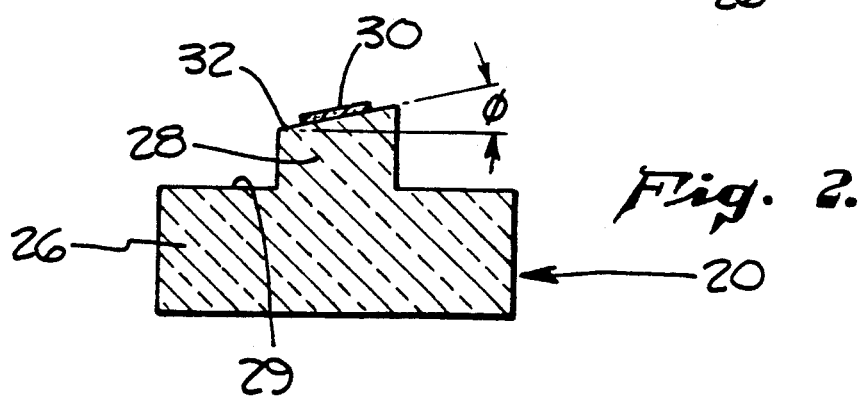
FIG. 2 is a detailed top view of the laser mirror mount of FIG. 1 showing a variation thereof.

As seen in FIG. 2, one variation of the mirrors 20 and 24 includes the mirror stem 28 formed as a single part with mounting base 26. The mounting base 26 is formed with a top inner surface 29 which fits against the laser body 12 when the mirror is mounted to the laser body. A mirror mounting surface 32 is arranged at an angle $\phi$ to the top surface 29 of mirror mounting base 26. The arrangement of surface 32 at an angle $\phi$ permits the mirror 30 mounted thereon to be slightly tilted when mounted upon the laser body 12. In the embodiment shown in FIG. 1, one or both of the mirrors 20 or 24 may have a wedged stem. Further, the mirror 30 may be mounted directly on the surface 32 or may be placed upon a substrate illustrated schematically at 30 and then mounted with the substrate upon surface 32.

It will be seen from FIGS. 1 and 2 that a rotational motion of the mirror mounting base 26 will adjust the angle of incidence of the laser beam 16 as it strikes mirror 30. Similarly, a translational motion of the base 20, while not adjusting the angle of incidence of the laser beam, will adjust the pathlength thereof. It will now be seen that the stem 28 and its mirror 30 may be used to fine tune the adjustment of the pathlength 16 of the laser 10. A similar approach is shown in U.S. Pat. No. 4,317,089.

A more important feature of the stem 28 is that it may be designed with a coefficient of thermal expansion which permits the stem 28 to expand in a direction opposite to the thermal expansion of the laser body 12. For example, if the laser body 12 were heated from a lower to a higher temperature, the body 12 would expand in an outward direction carrying with it the laser mirror 20 and the mirror mounting base 26. Simultaneously, thermal heating would cause an expansion of stem 28 and an inward movement of its surface that mounts the mirror 30. With proper selection of size and material, the thermal expansions of the laser block 12 and mirror mounting stem 28 can be chosen to retain the mirror 30 at the same point within the laser path 16.

The expression for the change in optical pathlength $\Delta L$, as shown by laser beam 16, due to the uniform change in temperature T of an arbitrary ring having a single intracavity Faraday rotator and multiple passive pathlength control (PPLC) mirrors 20 and 24, for example, is expressed in degrees Centigrade as follows:

$$\Delta L = \left( \alpha_\beta L + [(n_R - 1)\alpha_R + dn_R/dT] d_R - \sum_i 2\alpha_i t_i \cos \Theta_i \right) \Delta T$$

where:
$\alpha_i$ = the expansion coefficient of PPLC mirror stem i
$t_i$ = the thickness of PPLC mirror stem i
$\phi_i$ = the angle of incidence on PPLC mirror i
$d_R$ = the Faraday rotator thickness
$\alpha_R$ = the Faraday rotator expansion coefficient
$n_R$ = the Faraday rotator refractive index
$\alpha_\beta$ = the expansion coefficient of the block
L = the optical pathlength of the ring
T = absolute temperature.

The first term on the right hand side is the contribution from block expansion, the second term (in square brackets) from the Faraday rotator, and the summation term from the PPLC mirrors. The factor of 2 in the summation term accounts for a given mirror motion giving rise to equal pathlength changes for both adjacent legs. The contribution from the gas discharge within passage 14 which causes the lasing activity is negligible for practical considerations. The expression is strictly valid only for $\Delta T$ small enough that the thermal expansivities $\alpha$ are essentially independent of temperature. The expression can be generalized in an obvious way to allow for the fact that real low-expansion materials have a substantial variation in expansivity for temperature ranges $\Delta T$ larger than some tens of ° C.

For the case of a clear-path folded rhombus ring with mounted PPLC mirrors i=1,2, with $\alpha_1 = \alpha_2$, $=\alpha$, $\Theta_1 = \Theta_2 = \Theta$, and $t_1 = t_2$, $=t$, the condition for constant pathlength becomes simply:

$$t = \alpha_\beta L / (4 \alpha \cos \Theta).$$

Table 1 below lists the PPLC mirror stem thickness t (in mm) required for the case of a 25-cm tetrahedral ring (30° angle of incidence). Block materials feasible for the family of ring laser gyros listed above are identified in the first column. Mirror materials that might be used for PPLC mirrors are listed in the top row. The (constant) coefficient of thermal expansion (CTE) assumed for each material is given in parentheses (in ppm per degree C). By Pyrex is meant the Corning borosilicate glass Code 7740. ULE Quartz is Corning's Code 7971 titanium silicate, and the fused silica values are for Corning Code 7940. The Rayceram is a Raytheon isostatically pressed ceramic. No table entries are given for cases where the block expansivity is greater or equal to the mirror expansivity.

Table 1 includes an intracavity Faraday rotator of thickness 0.5 mm. The material characteristics assumed for the Faraday rotator are:
refractive index: 1.69
temperature derivative of index: 7.5 ppm per ° C.
expansion coefficient: 4.7 ppm per ° C.
The thermal expansivities (CTE, in ppm) and corresponding mirror stem thicknesses (in mm) in Table 1 are valid for the range 20° to 40° C.

TABLE 1

| Block Material | Mirror Material CTE | Fused Silica | Pyrex | Glass | Aluminum |
|---|---|---|---|---|---|
| | | (0.50) | (3.2) | (10) | (20) |
| Ideal Block | (0.00) | 3.1 | 0.48 | 0.15 | 0.08 |
| ULE Quartz | (0.01) | 4.5 | 0.71 | 0.23 | 0.11 |
| Zerodur | (0.05) | 10.3 | 1.6 | 0.52 | 0.26 |
| Fused Silica | (0.5) | — | 11.8 | 3.8 | 1.9 |
| Rayceram | (0.69) | — | 16.0 | 5.1 | 2.6 |
| Pyrex | (3.2) | — | — | 23.2 | 11.6 |

It has been found that the Faraday rotator adds only a slight perturbation to the stem length required to compensate for the thermal expansion of the block.

Figure 3:
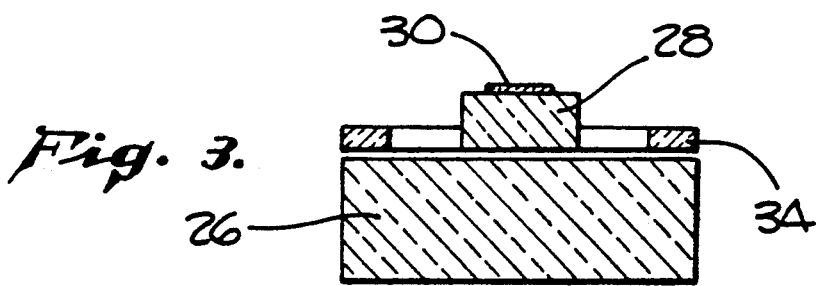
FIG. 3 is a detailed view similar to FIG. 2 showing another variation of the laser mirror mount.

Referring now to FIG. 3, a variation of the laser mirror mount is shown. In this embodiment, the stem 28 and mirror mounting base 26 may be made from two separate pieces of material to simplify fabrication. In yet another arrangement, the stem 28 may be made from a standard or fixed dimension with a washer 34 added to the interior surface of mounting base 26 at its outer periphery. The washer 34 may be made from various thicknesses. These varying thicknesses permit the assembly of a laser 10 upon the laser body 12 by using standard sized stems 28. Different washers 34 are then added to accommodate for tolerance variations around the laser body 12.

Figure 4:
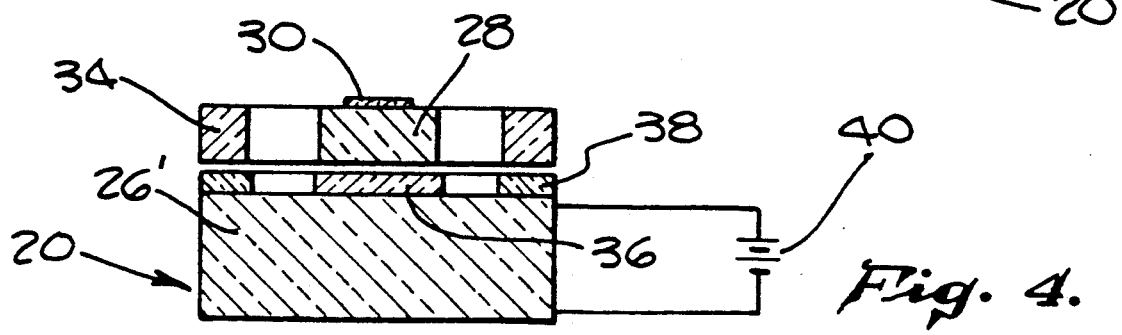
FIG. 4 is a detailed view showing yet another variation of the laser mirror mount.

Yet another variation of the laser mirror mount is shown in FIG. 4. Like FIG. 3, a washer 34 may be added to the mirror mounting base 26. It may be desirable to mount the mirror 30 generally flush with the surface that is cut to accommodate the mounting base 26, as shown in the upper right hand corner of FIG. 1. In this case, the washer 34 can be made to have the same thickness as the stem 28. To accommodate for tolerance variations between laser blocks, it is possible to design the stem 28 and washer 34 to have the same dimensions. Thereafter, additional spacers for the stem and additional spacers for the washer, 36 and 38 respectively, may be used.

In a low-cost, six-frequency ring laser gyro, such as that shown in U.S. Pat. No. 4,687,331, pathlength control is not required. However, certain error sources, such as backscatter coupling, do depend on pathlength in general and on the relative mirror distances in particular. The passive pathlength control (PPLC) using the thermal expansion of stem 28 is an effective means to minimize such errors as backscatter coupling over an extended temperature range.

In ring laser gyros where high accuracy is desired, the passive pathlength control (PPLC) of the present invention may be combined with active pathlength control to reduce the working range of such active pathlength control. In these circumstances, the utilization of the active pathlength control provided by a piezoelectric mirror, for example, may be employed in combination with the passive pathlength control provided by the stem 28. A piezoelectric mirror or other piezoelectric element will typically provide for variations in the laser pathlength of two to four wavelengths of the frequency of the laser beam. Thus, fine tuning may be accomplished by forming the substrate of the laser mirror 30 or, as shown in FIG. 4, the laser mounting base 26 from a piezoelectric crystal. The application of a voltage supplied by power source 40 across the piezoelectric crystal shown in FIG. 4 at 26' will cause the crystal to compress or expand depending on the voltage applied. The reduced amount of compression or expansion due to the presence of the thermally expanding or contracting stem 28 will permit the reduction of the working range of the piezoelectric crystal 26', thus reduce system errors. This compression or expansion, coupled with the thermal expansion of stem 28, can produce a combination of active and passive pathlength control which will significantly improve the accuracy of the ring laser gyro within which the passive pathlength control mirror 20 is mounted. Further, by substantially reducing the amount of flexure required by the piezoelectric crystal, the amount of tilt previously created by utilization of piezoelectric crystal mirrors may be significantly reduced.

The mounting of mirror 30 at an angle $\phi$ on stem 28 permits the adjustment of the pathlength of the ring laser gyro 10, independently of piezoelectric crystal or mirror deflection. This permits the gyro 00 to be set up at a predetermined ambient temperature for further optimizing performance.

The reader will understand that other modifications of the embodiments described in FIGS. 1-4 above will become apparent to a person skilled in the art. Accordingly, the present invention should not be limited except as defined by the appended claims.

What is claimed is:

1. A laser mirror mount for use in a laser, said laser formed in a laser body having a plurality of laser mirrors mounted upon said body for establishing the pathlength of a laser beam within said body, wherein the improvement comprises:

a mounting base mounted upon said laser body;

a stem attached to said mounting base extending therefrom toward said laser body;

said stem mounting a laser mirror in the path of said laser beam; and said stem having a coefficient of thermal expansion selected to maintain said mirror mounted thereon at a fixed point in the path of said laser beam while said laser body expands in a first direction due to thermal heating and said stem expands in a second direction due to said thermal heating.

2. The laser mirror mount of claim 1, additionally comprising:

said stem attached to said mounting base at a first angle and mounting said laser mirror at a second angle to form a wedge angle between said base and said laser mirror, whereby movement of said base on said laser body adjusts the point on said mirror struck by said laser beam to, in turn, adjust said pathlength of said laser beam.

3. The laser mirror mount of claim 2, wherein:

said movement of said base on said laser body is a translational movement.

4. The laser mirror mount of claim 2, wherein:

said movement of said base on said laser body is a rotational movement.

5. The laser mirror mount of claim 1, additionally comprising:

said mounting base and said stem are formed from one piece of material.

6. The laser mirror mount of claim 1, additionally comprising:

said mounting base and said stem are formed by two separate pieces of material.

7. The laser mirror mount of claim 1, additionally comprising:

said stem having a mirror mounting surface; and said laser mirror formed and mounted directly upon said mirror mounting surface.

8. The laser mirror mount of claim 1, additionally comprising:

said stem having a mirror mounting surface; and said mirror formed upon a substrate which, in turn, mounts upon said mirror mounting surface.

9. The laser mirror mount of claim 1, additionally comprising:

said mounting base having an inner surface closest to said laser body and an outer periphery on said inner surface surrounding an inner region thereon;

a washer mounted upon said outer periphery of said inner surface of said mounting base; and said stem mounted upon said inner region of said inner surface of said mounting base.

10. The laser mirror mount of claim 9, wherein:

said washer and stem have substantially the same thickness.

11. The laser mirror mount of claim 9, wherein:
said washer, stem and mounting base are separate pieces.

12. The laser mirror mount of claim 11, additionally comprising:
said stem formed from first and second pieces, said first piece mounting said laser mirror and having a fixed thickness, and said second piece having a variable thickness to adjust for tolerance variations in said laser body.

13. The laser mirror mount of claim 11, additionally comprising:
said washer formed from first and second pieces, said first piece having a fixed thickness, and said second piece having a variable thickness to adjust for tolerance variations in said laser body.

14. The laser mirror mount of claim 1, wherein said laser is chosen from a group consisting of a single frequency laser, a two-frequency laser, a four-frequency laser, or a six-frequency laser.

15. The laser mirror mount of claim 1, wherein said laser is chosen from a group consisting of a laser with a straight pathlength and two mirrors, a laser with a flat pathlength and three mirrors, a laser with a flat pathlength and four mirrors, or a laser with a folded pathlength and four or more mirrors.

16. The laser mirror mount of claim 1, additionally comprising:
at least one of said laser mirrors formed on a mounting base that includes a deformable piezoelectric crystal to obtain a fine tuning of said laser pathlength; and
at least one of said laser mirrors formed on said stem attached to said mounting base to obtain a coarse tuning of said laser pathlength.

17. The laser mirror mount of claim 1, additionally comprising:
said mounting base includes a deformable piezoelectric crystal to obtain a fine tuning of said laser pathlength while said stem mounted thereon obtains a coarse tuning thereof.

18. A mount for a laser mirror to be used on a laser body, comprising:
a stem for mounting a laser mirror within a laser body, said stem and said laser body each having a thermal expansion;
a mounting base for mounting said stem to a laser body, wherein the thermal expansion of said stem counteracts thermal expansion of said, laser body.

19. A mount for a laser mirror to be used on a laser body, comprising:
a stem for mounting a laser mirror within a laser body, said stem and said laser body each having a thermal expansion;
a mounting base for mounting said stem to a laser body, wherein thermal expansion of said stem counteracts thermal expansion of said laser body; and
a piezoelectric crystal whose expansion further counteracts thermal expansion of said laser body.

20. The mount for a laser mirror of claim 19, wherein:
said mounting base is formed of said piezoelectric crystal.

21. The mount for a laser mirror of claim 19, wherein:
said mirror is mounted upon a substrate; and
said substrate is formed of said piezoelectric crystal.

* * * * *